(12) United States Patent
Li et al.

(10) Patent No.: US 11,959,379 B2
(45) Date of Patent: Apr. 16, 2024

(54) METHOD FOR MEASURING GAS PRESSURE OF CLOSE-DISTANCE SEAM GROUP SIMULTANEOUSLY

(71) Applicant: Anhui University of Science and Technology, Huainan (CN)

(72) Inventors: Shaobo Li, Huainan (CN); Lei Wang, Huainan (CN); Xingang Niu, Huainan (CN); Chuanqi Zhu, Huainan (CN); Zhenyu Yang, Huainan (CN); Lipeng Chen, Huainan (CN); Yu Zhang, Huainan (CN)

(73) Assignee: Anhui University of Science and Technology, Huainan (CN)

( * ) Notice: Subject to any disclaimer, the term of this patent is extended or adjusted under 35 U.S.C. 154(b) by 0 days.

(21) Appl. No.: 18/505,882

(22) Filed: Nov. 9, 2023

(65) Prior Publication Data

US 2024/0068359 A1    Feb. 29, 2024

Related U.S. Application Data

(63) Continuation of application No. PCT/CN2022/086998, filed on Apr. 15, 2022.

(30) Foreign Application Priority Data

Mar. 24, 2022   (CN) .......................... 202210303035.7

(51) Int. Cl.
*E21B 47/06*   (2012.01)
*C04B 28/00*   (2006.01)
*E21F 17/18*   (2006.01)

(52) U.S. Cl.
CPC .............. *E21B 47/06* (2013.01); *C04B 28/00* (2013.01); *E21F 17/18* (2013.01)

(58) Field of Classification Search
CPC ............ E21B 47/06; C04B 28/00; C09K 8/34
(Continued)

(56) References Cited

U.S. PATENT DOCUMENTS 4,010,800 A * 3/1977 Terry .................... E21B 43/243
                                                      48/210
4,452,551 A    6/1984 Arndt et al.
(Continued)

FOREIGN PATENT DOCUMENTS

CN    1160694 A    10/1997
CN    101033121 A    9/2007
(Continued)

OTHER PUBLICATIONS

Feng, Research on the Superhigh-water Packing Material and Filling Mining Technology and Their Application, Doctoral Thesis submitted to China University of Mining and Technology, dated Jun. 15, 2011.
(Continued)

*Primary Examiner* — William D Hutton, Jr.
*Assistant Examiner* — Ashish K Varma
(74) *Attorney, Agent, or Firm* — Westbridge IP LLC

(57) ABSTRACT

Disclosed is a method for measuring gas pressure of a close-distance seam group simultaneously, including the following steps: constructing a pressure-measuring drill hole inclined downwards; lowering a first seam piezometer tube, lowering a baffle and a polyurethane blocking material after a tube head reaching a lowermost seam; and installing a gas pressure gauge; lowering a second seam piezometer tube, lowering the baffle and the polyurethane blocking material after the tube head reaching a second layer of seam; and installing the gas pressure gauge; lowering a $n^{th}$ seam piezometer tube, lowering the baffle and the polyurethane blocking material after the tube head reaching a $n^{th}$ layer of
(Continued)

seam; and installing the gas pressure gauge; injecting a high-water and quick-solidifying material into the drill hole; and connecting the gas pressure gauges through optical fibers, and connecting the gas pressure gauges with a ground control system.

7 Claims, 2 Drawing Sheets

(58) Field of Classification Search
USPC .......................................................... 166/292
See application file for complete search history.

(56) References Cited

U.S. PATENT DOCUMENTS

| | | | |
|---|---|---|---|
| 6,641,658 | B1 | 11/2003 | Dubey |
| 2004/0149174 | A1* | 8/2004 | Farrington .......... C04B 24/2605 |
| | | | 106/808 |
| 2004/0149431 | A1* | 8/2004 | Wylie .................. E21B 43/103 |
| | | | 175/57 |
| 2008/0096774 | A1 | 4/2008 | Tabary et al. |
| 2008/0302276 | A1* | 12/2008 | Perez-Pena ............. C04B 28/04 |
| | | | 106/690 |
| 2012/0224801 | A1* | 9/2012 | Laing ................ G02B 6/02395 |
| | | | 385/94 |
| 2013/0112116 | A1 | 5/2013 | Buerge et al. |
| 2013/0118381 | A1 | 5/2013 | Frenkenberger et al. |

FOREIGN PATENT DOCUMENTS

| | | |
|---|---|---|
| CN | 201381872 Y | 1/2010 |
| CN | 102678167 A | 9/2012 |
| CN | 104628414 A | 5/2015 |
| CN | 104973835 A | 10/2015 |
| CN | 106496517 A | 3/2017 |
| CN | 106893062 A | 6/2017 |
| CN | 108798760 A | 11/2018 |
| CN | 109399994 A | 3/2019 |
| CN | 109469474 A | 3/2019 |
| CN | 109709297 A | 5/2019 |
| CN | 110016115 A | 7/2019 |
| CN | 110173231 A | 8/2019 |
| CN | 111963150 A | 11/2020 |
| CN | 112682092 A | 4/2021 |
| FR | 2420512 A1 | 10/1979 |
| JP | H08268738 A | 10/1996 |

OTHER PUBLICATIONS

First Office Action issued in counterpart Chinese Patent Application No. 202210303035.7, dated Oct. 9, 2022.

Liu et al., Application of Gas Pressure Measurement Device for Long Distance Coal Seam with Large Depression Angle in Qianjin Coal Mine, Safety in Coal Mines, 2020, 51(6), pp. 113-116, dated Jun. 20, 2020.

Sun, Research on Optimization of High Water Quick Setting Material in Grouting and Hole Sealing of Gas Drainage, Zhongzhou Coal, 2016, 241, pp. 30-32, p. 111, dated Jan. 25, 2016.

Yang et al., Pressure Measuring Technology Based on Polyurethane Fast Hole-Sealing in Long Borehole along Seam, Journal of Henan Polytechnic a University (Nature Science), 2015, 34(1), pp. 6-9, dated Feb. 15, 2015.

* cited by examiner

METHOD FOR MEASURING GAS PRESSURE OF CLOSE-DISTANCE SEAM GROUP SIMULTANEOUSLY

CROSS-REFERENCE TO RELATED APPLICATION

This application is a continuation of International Application No. PCT/CN2022/086998, filed on Apr. 15, 2022, which claims priority to Chinese Patent Application No. 202210303035.7, filed on Mar. 24, 2022. All of the aforementioned applications are incorporated herein by reference in their entireties.

TECHNICAL FIELD

The present disclosure relates to a method for measuring gas pressure of a seam, and particularly to a method for measuring gas pressure of a close-distance seam group simultaneously.

BACKGROUND

In China, geological conditions for coal occurrence are complicated, most of them are seam groups, with close seam spacing. Accurately measuring the seam gas pressure is of great significance for grade appraisal of coal mine gas and content test of seam gas.

In the existing method for measuring the seam gas pressure, each drill hole can only measure the gas pressure of one seam, and if it is necessary to measure the gas pressure of two or more seams in a seam group, the gas pressure can only be measured by gradually sealing holes after a plurality of drill holes are constructed. This method is not only time-consuming and labor-consuming, high in cost, but also exists a possibility of a failure in hole sealing.

Hence, how to implement simultaneous measurement for the gas pressure of a plurality of seams is an urgent puzzle to be solved at present.

SUMMARY

The technical problem to be solved by the present disclosure lies in providing a method for measuring gas pressure of a close-distance seam group simultaneously.

The present disclosure adopts the following technical solution to solve the foregoing technical problem.

A method for measuring a gas pressure of a close-distance seam group simultaneously includes the following steps of:
(1) constructing a drill hole in a direction near to a lower seam in a roadway; the drill hole being obliquely set, and a bottom of the drill hole entering a base plate of the seam for a certain distance; and adopting a water suction pump after the drill hole construction being completed, and pumping out accumulated water in the drill hole by connecting the pump with a flexible pipeline;
(2) lowering a first seam piezometer tube in the constructed drill hole; sequentially lowering a baffle and a polyurethane blocking material along the first seam piezometer tube after a tube head of the first seam piezometer tube reaching a position of a lowermost seam; and installing a corresponding gas pressure gauge on the first seam piezometer tube after the polyurethane blocking material solidifying;
(3) lowering a second seam piezometer tube; after a tube head of the second seam piezometer tube reaching a position of a second layer of seam in relative to the lowermost seam, sequentially lowering the baffle and the polyurethane blocking material at this seam position along the second seam piezometer tube; and installing a corresponding gas pressure gauge on the second seam piezometer tube after the polyurethane blocking material solidifying;
(4) lowering a $n^{th}$ seam piezometer tube; sequentially lowering the baffle and the polyurethane blocking material along the $n^{th}$ seam piezometer tube after a tube head of the $n^{th}$ seam piezometer tube reaching a position of a $n^{th}$ layer of seam in relative to the lowermost seam; and installing a corresponding gas pressure gauge on the $n^{th}$ seam piezometer tube after the polyurethane blocking material solidifying;
(5) injecting a high-water and quick-solidifying material into the drill hole through a grouting pipe; and after injecting the high-water and quick-solidifying material into an orifice, stopping grouping and removing the grouting pipe; and
(6) connecting various gas pressure gauges through optical fibers, and connecting the gas pressure gauges with a ground control system.

As one of preferred modes of the present disclosure, in step (1), the bottom of the drill hole enters the base plate of the seam by 0.5 m, and a hole diameter is 92 mm.

As one of preferred modes of the present disclosure, in step (2), the position of the baffle in the inclined drill hole is specifically located at a junction of the lowermost seam and an upper stratum thereof, the tube head of the first seam piezometer tube is located below the baffle, and the polyurethane blocking material is located above the baffle;
  in step (3), the position of the baffle in the inclined drill hole is specifically located at a junction of the second layer of seam and an upper stratum thereof, the tube head of the second seam piezometer tube is located below the baffle, and the polyurethane blocking material is located above the baffle; and
  in step (4), the position of the baffle in the inclined drill hole is specifically located at a junction of the $n^{th}$ seam and an upper stratum thereof, the tube head of the $n^{th}$ seam piezometer tube is located below the baffle, and the polyurethane blocking material is located above the baffle.

As one of preferred modes of the present disclosure, in steps (2), (3) and (4), the first seam piezometer tube, the second seam piezometer tube and the $n^{th}$ seam piezometer tube are all made of stainless steel materials, and the tube heads are all composed of sieve tubes. The gas enters the piezometer tubes via the sieve tubes.

As one of preferred modes of the present disclosure, in steps (2), (3) and (4), the polyurethane blocking material includes the following raw materials in parts by weight: 20-30 parts of polyether polyol, 10-15 parts of castor oil polyol, 10-15 parts of dimethyl methyl phosphonate, 1.5-2.5 parts of dimethylolpropionic acid, 1.5-2.5 parts of phosphate diol OP550, 0.5-0.85 parts of dibutyltin dilaurate and 55-65 parts of methylene diphenyl diisocyanate.

As one of preferred modes of the present disclosure, in step (5), the high-water and quick-solidifying material is composed of a material A and a material B which are mixed in a weight ratio of 1:1, after mixing, 90%-95% of water is added for use, where the material A includes the following raw materials in parts by weight: 50-70 parts of monohydrallite and 5-10 parts of compound super-retarding dispersing agent, and the material B includes the following raw materials in parts by weight: 10-30 parts of lime, 10-30 parts of gypsum, 5-10 parts of Baifang thiophanate methyl suspending agent and 5-10 parts of compound fast-setting early strength agent.

As one of preferred modes of the present disclosure, the compound super-retarding dispersing agent includes sodium hexametaphosphate, phosphine butanetricarboxylic acid and water, and a weight ratio of the sodium hexametaphosphate to the phosphine butanetricarboxylic acid to the water is (10-15):1:3.

As one of preferred modes of the present disclosure, the compound fast-setting early strength agent includes lithium carbonate, calcium formate, desulfurized gypsum and sodium nitrite, and a weight ratio of the lithium carbonate to the calcium formate to the desulfurized gypsum to the sodium nitrite is 1:3:(15-20):(15-20).

As one of preferred modes of the present disclosure, the gas pressure gauge is specifically a resistance remote pressure gauge.

As one of preferred modes of the present disclosure, a slide-wire resistance-type transmitter is arranged inside the resistance remote pressure gauge; the slide-wire resistance-type transmitter transmits a pressure value signal to a secondary instrument away from a measuring position through the optical fibers, the secondary instrument is networked with the ground control system to achieve a long-distance transmission, and a mine dispatching center is networked to display the reading of the pressure gauge.

Compared with the prior art, the advantages of the present disclosure lie in as follows.
  (1) The pressure of two or more adjacent seams of the seam group may be measured simultaneously by constructing one pressure-measuring drill hole only, so the present disclosure has the advantages of saving cost and accurate measurement.
  (2) During the construction of the drill hole, the vertical drill hole is mostly adopted in this field, thus the seam below the roadway will be directly affected by mining, and then the accuracy of the pressure-measuring result is directly affected; and in the present disclosure, the roadway away from the pressure-measuring position is selected for an inclined drilling construction, which can effectively avoid the foregoing problem.
  (3) The polyurethane blocking material adopted by the present disclosure has the following advantages: a. on the premise of not affecting the concretion strength required by the blocking material, the polyurethane consolidated body is obviously improved in an expansion multiple, ensuring that the product has a greater compactness than other products during a fissure filling process; b. a reactant crosslinking degree is increased using polyfunctional polyether polyol, and the product strength is obviously improved; and c. a part of polyether polyol is replaced with a castor oil polyol sample, which improves the reaction rate and reduces the cost.
  (4) During hole sealing of the present disclosure, adopting the high-water and quick-solidifying material to replace the traditional cement mortar has the following advantages: the single serous fluids of two main materials A, B of the high-water and quick-solidifying material may last for 35-48 h without solidifying, and the serous fluids may be quickly hydrated and solidified after being mixed; and furthermore, an initial setting strength of the consolidated body is about 20% of a final strength, and growth of a later strength is relatively slow.
  (5) In the present disclosure, the gas pressure gauge installed on the piezometer tube specifically selects the resistance remote pressure gauge, the slide-wire resistance-type transmitter is arranged inside the resistance remote pressure gauge; the slide-wire resistance-type transmitter transmits the pressure value signal to the secondary instrument away from the measuring position through the optical fibers, the secondary instrument is networked with the ground control system to achieve the long-distance transmission of numerical values.

DETAILED DESCRIPTION OF THE EMBODIMENTS

The embodiments of the present disclosure will be described in detail below. The embodiment is implemented under the precondition of the technical solution of the present disclosure, and the detail implementation modes and specific operation process are provided, but the protection scope of the present disclosure is not limited to the following embodiments.

Embodiment 1

Figure 1:
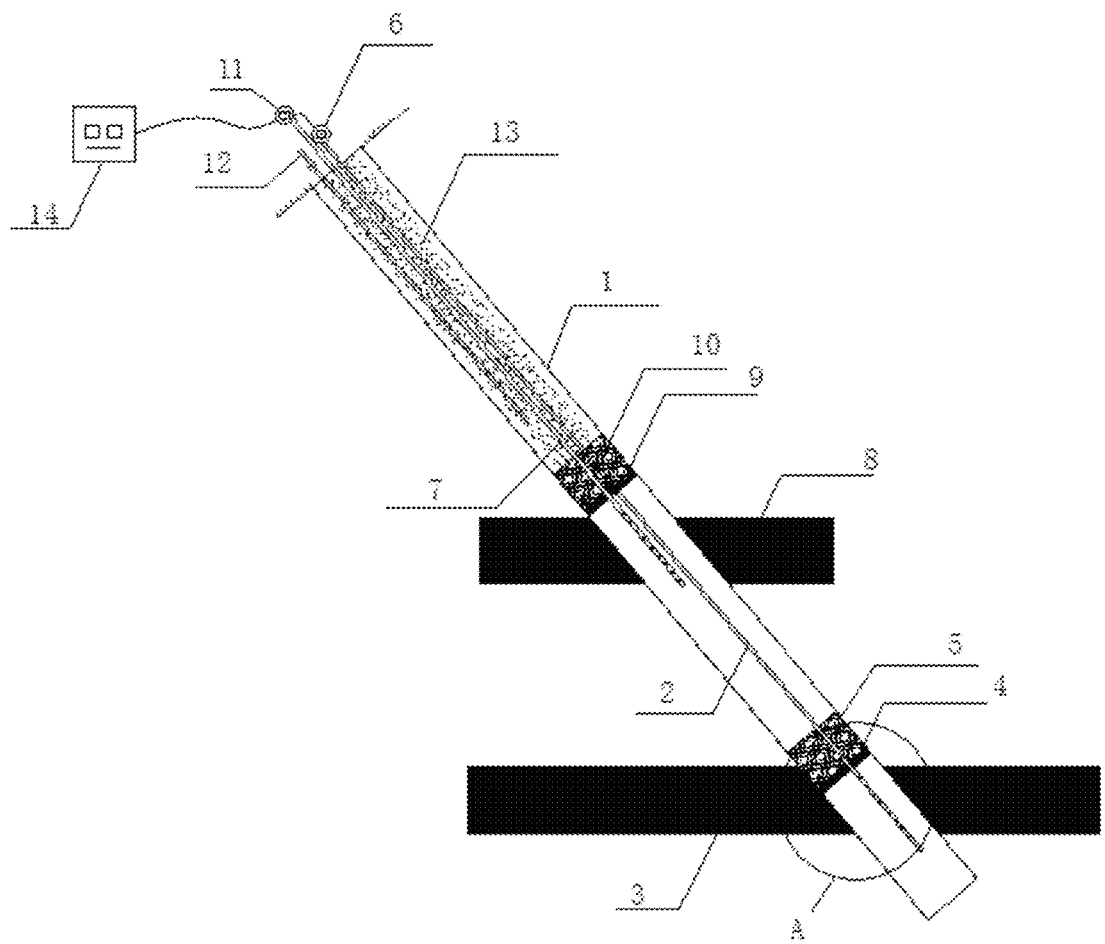
FIG. 1 is a schematic diagram of various structures of a hole-sealing method in Embodiment 1.
Figure 2:
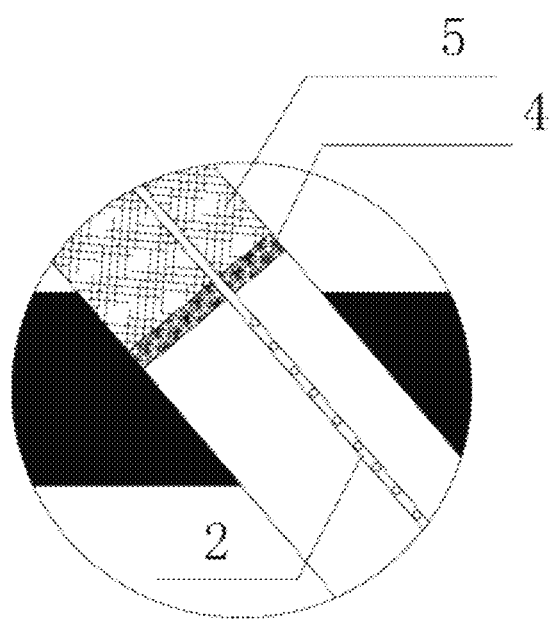
FIG. 2 is an enlarged view of a structure of a part A in FIG. 1.

A method for measuring gas pressure of a close-distance seam group (double seams) simultaneously in this embodiment, referring to FIG. 1 and FIG. 2, includes the following steps.
  (1) Constructing an inclined drill hole 1 in a direction near to a lower seam in a roadway, a bottom of the drill hole 1 entering a base plate of the seam for 0.5 m (the length distance of the drill hole 1), and a hole diameter being 92 mm; and adopting a water suction pump after the drill hole 1 construction being completed, and pumping out accumulated water in the drill hole 1 by connecting the pump with a flexible pipeline.
  (2) Lowering a first seam piezometer tube 2 in the constructed drill hole 1; sequentially lowering a first baffle 4 and a first polyurethane blocking material 5 along the first seam piezometer tube 2 after a tube head of the first seam piezometer tube 2 reaching a position of a lowermost seam 3; and installing a first gas pressure gauge 6 on the first seam piezometer tube 2 after the first polyurethane blocking material 5 solidifying, where the position of the first baffle 4 in the drill hole 1 is specifically located at a junction of the lowermost seam 3 and an upper stratum thereof, the tube head of the first seam piezometer tube 2 is located below the first baffle 4, and the first polyurethane blocking material 5 is located above the first baffle 4.
  (3) Lowering a second seam piezometer tube 7; after a tube head of the second seam piezometer tube 7 reaching a position of a second layer of seam 8 in relative to the lowermost seam 3, sequentially lowering a second baffle 9 and a second polyurethane blocking material 10 along the second seam piezometer tube 8; and installing a second gas pressure gauge 11 on the second seam piezometer tube 7 after the second polyurethane blocking material 10 solidifying, where the position of the second baffle 9 in the drill hole 1 is specifically located at a junction of the second layer of seam 8 and an upper stratum thereof, the tube head of the second seam piezometer tube 7 is located below the second baffle 9, and the second polyurethane blocking material 10 is located above the second baffle 9.

(4) Injecting a high-water and quick-solidifying material 13 into the drill hole 1 through a grouting pipe 12; and after injecting the high-water and quick-solidifying material 13 into an orifice, stopping grouping and removing the grouting pipe 12.

(5) Various gas pressure gauges adopting a resistance remote pressure gauge (YTZ-resistance remote pressure gauge manufactured by China Hongqi Instrument Co., Ltd.), connecting the gas pressure gauges through optical fibers, and connecting the gas pressure gauges with the ground control system 14.

Specifically, in this embodiment, various seam piezometer tubes are all made of stainless steel materials, the tube heads are all composed of sieve tubes, and the gas enters the piezometer tubes via the sieve tubes.

Specifically, in this embodiment, a slide-wire resistance-type transmitter is arranged inside the resistance remote pressure gauge; the slide-wire resistance-type transmitter transmits a pressure value signal to a secondary instrument away from a measuring position through the optical fibers, the secondary instrument is networked with the ground control system to achieve a long-distance transmission, and a mine dispatching center is networked to display the reading of the pressure gauge.

The gas pressure of two seams is measured by a same drill hole 1; the first seam piezometer tube 2 is lowered in the drill hole 1 first, the tube heads of the test tubes are composed of the sieve tubes (for gas entry); then the first baffle 4 is lowered, the first polyurethane blocking material 5 blocks the lowermost seam 3, such that the gas of the lowermost seam 3 cannot enter the upper seam through a pipeline; and then the second seam piezometer tube 7 is lowered, the tube heads of the test tubes are composed of the sieve tubes (for gas entry); then the second baffle 9 is lowered, the second polyurethane blocking material 10 blocks the second layer of seam 8, and the high-water and quick-solidifying material 13 is injected to achieve closure.

Embodiment 2

A method for measuring gas pressure of a close-distance seam group (three seams) simultaneously in this embodiment is basically the same as Embodiment 1, and the main differences lie in: the following steps are included between the step (3) and the step (4): lowering a third seam piezometer tube; sequentially lowering a third baffle and a third polyurethane blocking material along the third seam piezometer tube after a tube head of the third seam piezometer tube reaching a position of a third layer of seam in relative to the lowermost seam; and installing a third gas pressure gauge on the third seam piezometer tube after the third polyurethane blocking material solidifying, where the position of the third baffle in the inclined drill hole is specifically located at a junction of the third seam and an upper stratum thereof, the tube head of the third seam piezometer tube is located below the third baffle, and the third polyurethane blocking material is located above the third baffle.

Embodiment 3

A foregoing embodiment of this embodiment adopts the polyurethane blocking material.

The polyurethane blocking material includes the following raw materials in parts by weight: 20 parts of polyether polyol, 10 parts of castor oil polyol, 10 parts of dimethyl methyl phosphonate, 1.5 parts of dimethylolpropionic acid, 1.5 parts of phosphate diol OP550, 0.5 parts of dibutyltin dilaurate and 55 parts of methylene diphenyl diisocyanate.

Embodiment 4

A foregoing embodiment of this embodiment adopts the polyurethane blocking material.

The polyurethane blocking material includes the following raw materials in parts by weight: 25 parts of polyether polyol, 12 parts of castor oil polyol, 12 parts of dimethyl methyl phosphonate, 2 parts of dimethylolpropionic acid, 2 parts of phosphate diol OP550, 0.6 parts of dibutyltin dilaurate and 60 parts of methylene diphenyl diisocyanate.

Embodiment 5

A foregoing embodiment of this embodiment adopts the polyurethane blocking material.

The polyurethane blocking material includes the following raw materials in parts by weight: 30 parts of polyether polyol, 15 parts of castor oil polyol, 15 parts of dimethyl methyl phosphonate, 2.5 parts of dimethylolpropionic acid, 2.5 parts of phosphate diol OP550, 0.85 parts of dibutyltin dilaurate and 65 parts of methylene diphenyl diisocyanate.

Embodiment 6

A foregoing embodiment of this embodiment adopts the high-water and quick-solidifying material.

The high-water and quick-solidifying material is composed of a material A and a material B which are mixed in a weight ratio of 1:1, after mixing, 90% of water is added for use, where the material A includes the following raw materials in parts by weight: 50 parts of monohydrallite and 5 parts of compound super-retarding dispersing agent, and the material B includes the following raw materials in parts by weight: 10 parts of lime, 10 parts of gypsum, 5 parts of Baifang thiophanate methyl suspending agent and 5 parts of compound fast-setting early strength agent.

Further, the compound super-retarding dispersing agent includes sodium hexametaphosphate, phosphine butanetricarboxylic acid and water, and a weight ratio of the sodium hexametaphosphate to the phosphine butanetricarboxylic acid to the water is 10:1:3.

Further, the compound fast-setting early strength agent includes lithium carbonate, calcium formate, desulfurized gypsum and sodium nitrite, and a weight ratio of the lithium carbonate to the calcium formate to the desulfurized gypsum to the sodium nitrite is 1:3:15:15.

Embodiment 7

A foregoing embodiment of this embodiment adopts the high-water and quick-solidifying material.

The high-water and quick-solidifying material is composed of a material A and a material B which are mixed in a weight ratio of 1:1, after mixing, 93% of water is added for use, where the material A includes the following raw materials in parts by weight: 60 parts of monohydrallite and 8 parts of compound super-retarding dispersing agent, and the material B includes the following raw materials in parts by weight: 20 parts of lime, 20 parts of gypsum, 8 parts of Baifang thiophanate methyl suspending agent and 8 parts of compound fast-setting early strength agent.

Further, the compound super-retarding dispersing agent includes sodium hexametaphosphate, phosphine butanetricarboxylic acid and water, and a weight ratio of the sodium hexametaphosphate to the phosphine butanetricarboxylic acid to the water is 12:1:3.

Further, the compound fast-setting early strength agent includes lithium carbonate, calcium formate, desulfurized gypsum and sodium nitrite, and a weight ratio of the lithium carbonate to the calcium formate to the desulfurized gypsum to the sodium nitrite is 1:3:18:18.

Embodiment 8

A foregoing embodiment of this embodiment adopts the high-water and quick-solidifying material.

The high-water and quick-solidifying material is composed of a material A and a material B which are mixed in a weight ratio of 1:1, after mixing, 95% of water is added for use, where the material A includes the following raw materials in parts by weight: 70 parts of monohydrallite and 10 parts of compound super-retarding dispersing agent, and the material B includes the following raw materials in parts by weight: 30 parts of lime, 30 parts of gypsum, 10 parts of Baifang thiophanate methyl suspending agent and 10 parts of compound fast-setting early strength agent.

Further, the compound super-retarding dispersing agent includes sodium hexametaphosphate, phosphine butanetricarboxylic acid and water, and a weight ratio of the sodium hexametaphosphate to the phosphine butanetricarboxylic acid to the water is 15:1:3.

Further, the compound fast-setting early strength agent includes lithium carbonate, calcium formate, desulfurized gypsum and sodium nitrite, and a weight ratio of the lithium carbonate to the calcium formate to the desulfurized gypsum to the sodium nitrite is 1:3:20:20.

The above are only optional embodiments of the present disclosure and not intended to limit the present disclosure. Any modifications, equivalent replacements, improvements and the like made within the spirit and principle of the present disclosure shall fall within the protection scope of the present disclosure.

What is claimed is:

1. A method for measuring gas pressure of a close-distance seam group simultaneously, comprising the following steps of:
   (1) constructing a drill hole in a direction near to a lower seam in a roadway; the drill hole being obliquely set, and a bottom of the drill hole entering a base plate of the seam for a certain distance; and adopting a water suction pump after the drill hole construction being completed, and pumping out accumulated water in the drill hole by connecting the pump with a flexible pipeline;
   (2) lowering a first seam piezometer tube in the constructed drill hole; sequentially lowering a baffle and a polyurethane blocking material along the first seam piezometer tube after a tube head of the first seam piezometer tube reaching a position of a lowermost seam; and installing a corresponding gas pressure gauge on the first seam piezometer tube after the polyurethane blocking material solidifying;
   (3) lowering a second seam piezometer tube; after a tube head of the second seam piezometer tube reaching a position of a second layer of seam in relative to the lowermost seam, sequentially lowering the baffle and the polyurethane blocking material at this seam position along the second seam piezometer tube; and installing a corresponding gas pressure gauge on the second seam piezometer tube after the polyurethane blocking material solidifying;
   (4) lowering a $n^{th}$ seam piezometer tube; sequentially lowering the baffle and the polyurethane blocking material along the $n^{th}$ seam piezometer tube after a tube head of the $n^{th}$ seam piezometer tube reaching a position of a $n^{th}$ layer of seam in relative to the lowermost seam; and installing a corresponding gas pressure gauge on the $n^{th}$ seam piezometer tube after the polyurethane blocking material solidifying;
   (5) injecting a high-water and quick-solidifying material into the drill hole through a grouting pipe; and after injecting the high-water and quick-solidifying material into an orifice, stopping grouping and removing the grouting pipe; and
   (6) connecting various gas pressure gauges through optical fibers, and connecting the gas pressure gauges with a ground control system;
   wherein in step (5), the high-water and quick-solidifying material is composed of a material A and a material B which are mixed in a weight ratio of 1:1, after mixing, 90%-95% of water is added for use, wherein the material A comprises the following raw materials in parts by weight: 50-70 parts of monohydrallite and 5-10 parts of compound super-retarding dispersing agent, and the material B comprises the following raw materials in parts by weight: 10-30 parts of lime, 10-30 parts of gypsum, 5-10 parts of Baifang thiophanate methyl suspending agent and 5-10 parts of compound fast-setting early strength agent; the compound super-retarding dispersing agent comprises sodium hexametaphosphate, phosphine butanetricarboxylic acid and water, and a weight ratio of the sodium hexametaphosphate to the phosphine butanetricarboxylic acid to the water is (10-15):1:3; and the compound fast-setting early strength agent comprises lithium carbonate, calcium formate, desulfurized gypsum and sodium nitrite, and a weight ratio of the lithium carbonate to the calcium formate to the desulfurized gypsum to the sodium nitrite is 1:3:(15-20):(15-20).

2. The method for measuring the gas pressure of the close-distance seam group simultaneously according to claim 1, wherein in step (1), a bottom of the drill hole enters the base plate of the seam by 0.5 m, and a hole diameter is 92 mm.

3. The method for measuring the gas pressure of the close-distance seam group simultaneously according to claim 1, wherein in step (2), the position of the baffle in the inclined drill hole is specifically located at a junction of the lowermost seam and an upper stratum thereof, the tube head of the first seam piezometer tube is located below the baffle, and the polyurethane blocking material is located above the baffle;

in step (3), the position of the baffle in the inclined drill hole is specifically located at a junction of the second layer of seam and an upper stratum thereof, the tube head of the second seam piezometer tube is located below the baffle, and the polyurethane blocking material is located above the baffle; and in step (4), the position of the baffle in the inclined drill hole is specifically located at a junction of the $n^{th}$ seam and an upper stratum thereof, the tube head of the $n^{th}$ seam piezometer tube is located below the baffle, and the polyurethane blocking material is located above the baffle.

4. The method for measuring the gas pressure of the close-distance seam group simultaneously according to claim 1, wherein in steps (2), (3) and (4), the first seam piezometer tube, the second seam piezometer tube and the $n^{th}$ seam piezometer tube are all made of stainless steel materials, and the tube heads are all composed of sieve tubes.

5. The method for measuring the gas pressure of the close-distance seam group simultaneously according to claim 1, wherein in steps (2), (3) and (4), the polyurethane blocking material comprises the following raw materials in parts by weight: 20-30 parts of polyether polyol, 10-15 parts of castor oil polyol, 10-15 parts of dimethyl methyl phosphonate, 1.5-2.5 parts of dimethylolpropionic acid, 1.5-2.5 parts of phosphate diol OP550, 0.5-0.85 parts of dibutyltin dilaurate and 55-65 parts of methylene diphenyl diisocyanate.

6. The method for measuring the gas pressure of the close-distance seam group simultaneously according to claim 1, wherein the gas pressure gauge is specifically a resistance remote pressure gauge.

7. The method for measuring the gas pressure of the close-distance seam group simultaneously according to claim 6, wherein a slide-wire resistance-type transmitter is arranged inside the resistance remote pressure gauge, the slide-wire resistance-type transmitter transmits a pressure value signal to a secondary instrument away from a measuring position through the optical fibers, and the secondary instrument is networked with the ground control system.

* * * * *